INVENTOR
C. W. Hart

Feb. 3, 1970

C. W. HART 3,492,798

SUGAR CANE HARVESTING APPARATUS

Filed Sept. 11, 1967

INVENTOR
C. W. Hart

BY Wilkinson, Mawhinney & Theibautt
ATTORNEYS

*INVENTOR*
C. W. Hart

BY Wilkinson, Mawhinney & Theibault
*ATTORNEYS*

United States Patent Office 3,492,798
Patented Feb. 3, 1970

3,492,798
SUGAR CANE HARVESTING APPARATUS
Charles W. Hart, Hilo, Hawaii, assignor to C. Brewer and Company, Limited, a corporation of Hawaii
Filed Sept. 11, 1967, Ser. No. 666,649
Int. Cl. A01d 45/10
U.S. Cl. 56—17                                8 Claims

ABSTRACT OF THE DISCLOSURE

The present invention is directed to an apparatus for cutting of the specie of cane grown in Hawaii and Puerto Rico known as recumbent-type cane in which the sugar cane grows for a two-year period and does not necessarily grow in an erect position like the specie of cane raised in Louisiana. The harvester of the present invention is provided with a cutter for cutting the sugar cane from its main contact with the earth, which cutting is under the gauging control of a ground contour following unit pivotally connected to the front end of the harvester and which unit is pivoted to a primary frame for relative movement with respect thereto and which primary frame is pivotally mounted on a crawler-type tractor. Positioned to each side of the earth severing cutter are gathering chains between which is a skid plate which overlies the main portion of the cutter blade to direct the cut cane rearwardly and upwardly for engagement with a transverse conveyor which moves the cut cane laterally to one side of the harvester. At no time does the cut cane pass through the harvester or through the tractor unit upon which the harvester is mounted.

Cooperating with the cutting unit and laterally transverse conveyor unit may be a scroll member which is vertically elevatable toward and away from the cane entering the front-end of the harvester to adjust and allow the bulk feed of the cane stalks from the cutter to the transverse conveyor.

The gauging device is on a frame pivotally articulated to the portion of the main frame which carries the transverse conveyor and which may be adjusted to regulate the depth of cut or the height of cut above the ground line.

---

The object of the present invention is the provision of a main frame pivoted to a tractor having a major portion of the frame extending forwardly of the pivot in which the minor portion extends rearwardly of the pivot, which minor portion cooperates with the pivot frame to counterbalance the cane gathering and cutting means as well as the cane cutting gauging means carried by the major portion of the primary frame.

A further object of the present invention is the provision of a transverse conveyor means positioned rearwardly of the cane cutting means to receive the cane cut by the cutter and to direct the cane transversely to one side of the harvester in advance of the tractor unit upon which the primary frame carrying it is mounted.

A still further object of the invention is the provision of a sugar cane harvester wherein the cane gathering means are transversely spaced, endless chains positioned to each side of the cane cutter with their runs vertically disposed and having cane moving projections unstanding therefrom.

A still further object of the present invention is the provision of a sugar cane harvester of the type described, of a cane cutting gauging means comprising a secondary frame pivoted forwardly of the main frame for up and down movement relative thereto and having a pneumatic tyred wheel mounted for rotation and for maintaining contact with the ground, together with a hydraulic means connected between the two frames for causing relative pivotal movement therebetween to control the raising and lowering of the forward portion of the primary frame upon which the cane cutter is mounted to regulate the height above the ground at which the cane is cut.

A still further object of the present invention is the provision of a transverse conveyor which comprises in one form a plurality of runs of endless chains disposed in parallelism one above another at spaced intervals with their upper axis of drive tilted slightly rearwardly and the lowermost run being positioned to receive and transversely convey cane received from the cane cutter and cane movement projections carried by the outer run of each endless chain.

A still further object of the present invention is the provision of a scroll means positioned upon the gathering and cutting means of the harvester of the present invention, to assist directing cane between the cutter and transferring conveyor. Scroll means may further be mounted on a boom which is pivoted to an upright support on the forward portion of the primary frame for raising and lowering the scroll to accommodate cane of varying height and density.

With the foregoing and other objects in view, the information will be more fully described hereinafter, and will be more particularly pointed out in the claims appended hereto.

In the drawings, wherein like symbols refer to the like or corresponding parts throughout the different views. Now comes the description of the drawings.

Figure 1:
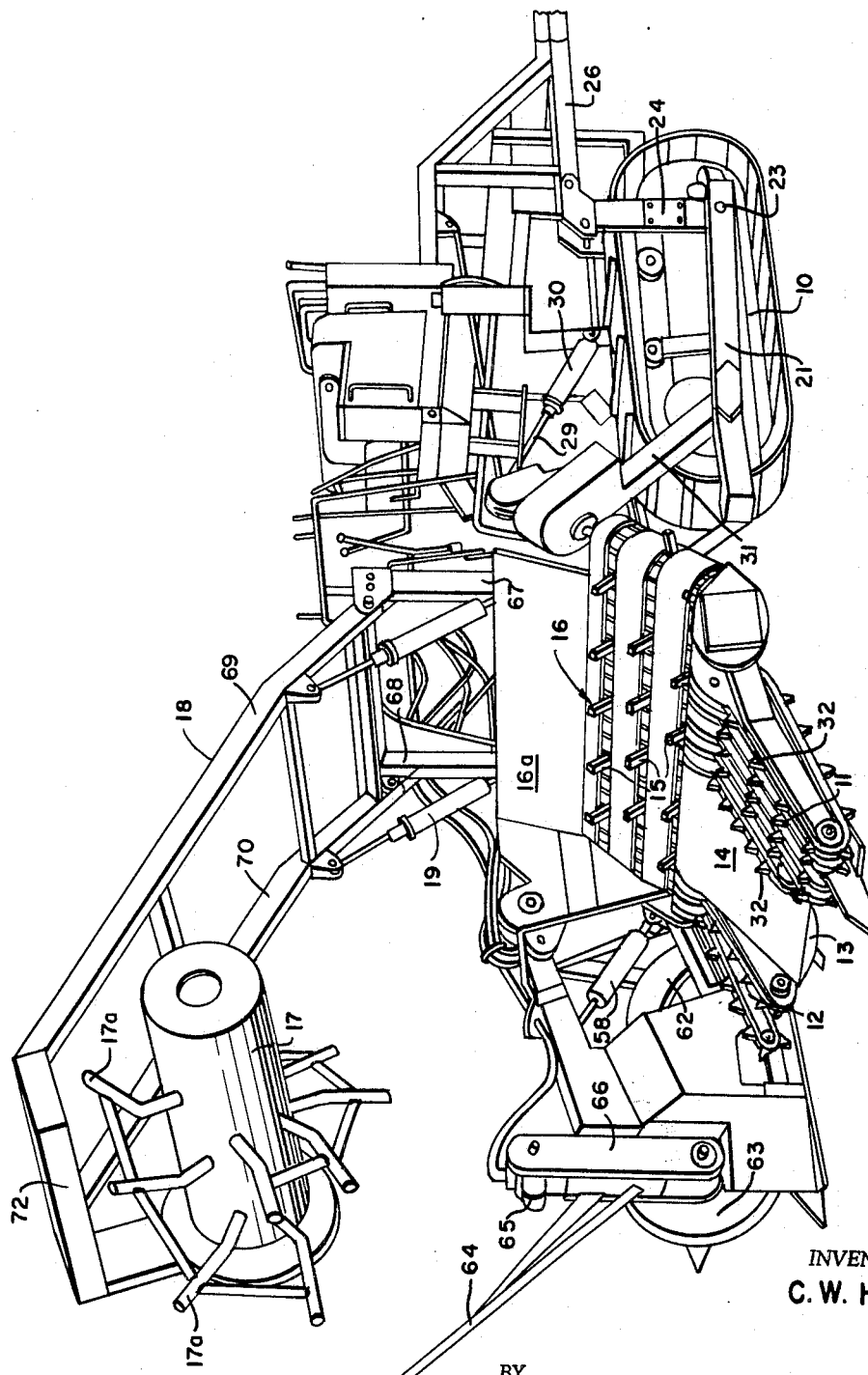
FIGURE 1 is a perspective view of a harvester constructed in accordance with the present invention, mounted on a crawler-type tractor and having the scroll in the raised position.

Referring more particularly to the drawings and for the moment to FIGURE 1, one form of the present invention is illustrated in which the harvester is shown as being mounted on a crawler-type tractor indicated generally at 10, having a harvester attachment mounted thereon on the front end thereof which comprises gathering members 11, 12, an earth cane cutting knife 13, a knife base plate 14 and a transverse conveyor 15, having three transverse runs of chains, with transverse projections 16 secured thereto. Cooperating with the earth cutting and gathering and lateral transverse conveyor 15 is a scroll 17 which likewise permits transfer movement of the sugar cane cut by the earth cutting member 13 to move the cut cane plus previously cut and stacked cane to the left of the harvester. The scroll 17 is mounted upon a boom arrangement 18 which may be hydraulically raised and lowered at 19 to accommodate varying heights and density of sugar cane.

Figure 2:
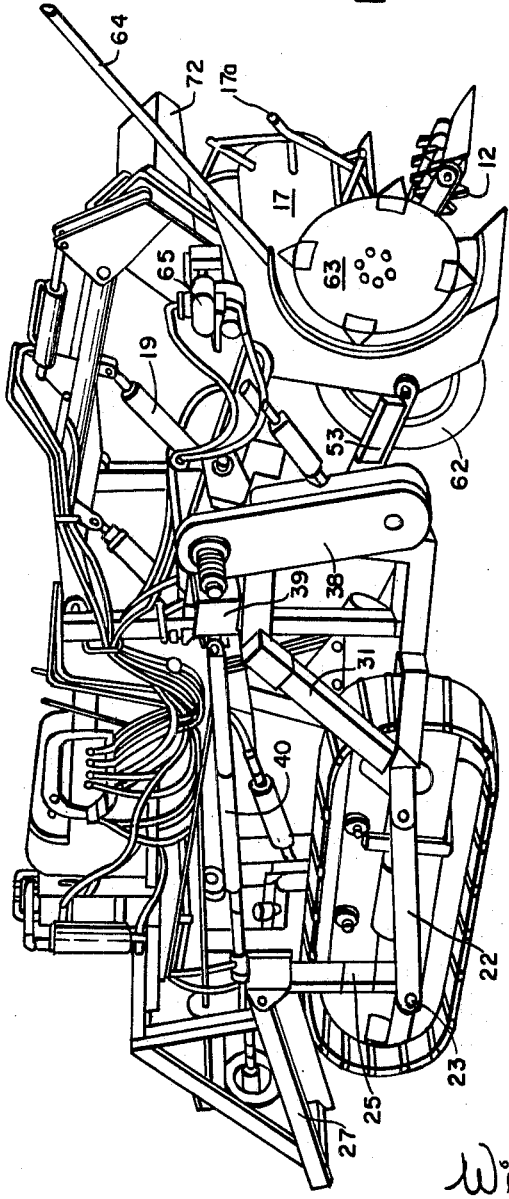
FIGURE 2 is a front perspective view taken from the right-hand, front end of a crawler tractor having the harvester of the present invention mounted thereon with the scroll in the lowered position.
Figure 3:
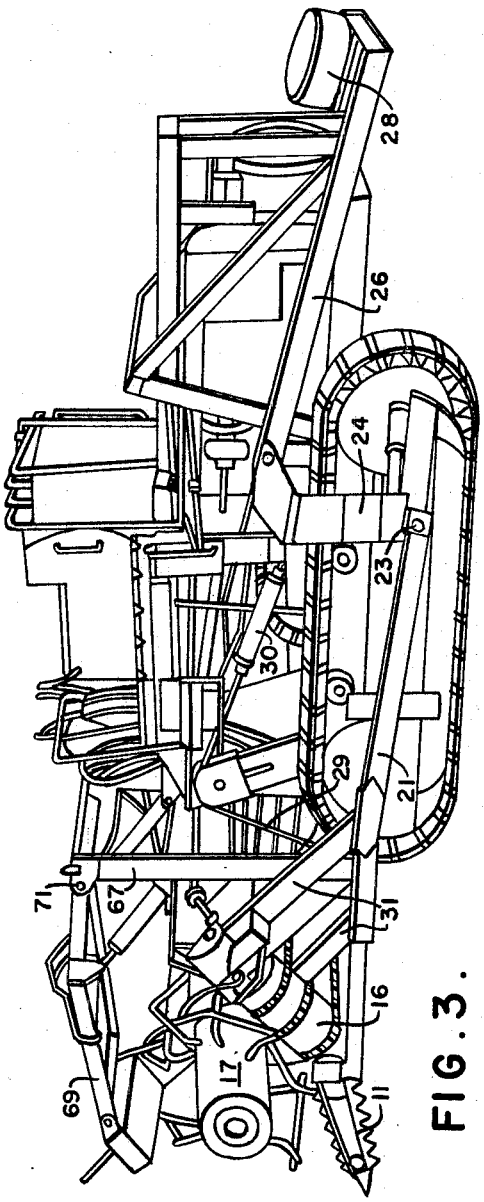
FIGURE 3 is a rear elevational view taken from the lefthand rear end of a crawler tractor having the harvester of the present invention mounted thereon, showing the counter-weighting system.
Figure 4:
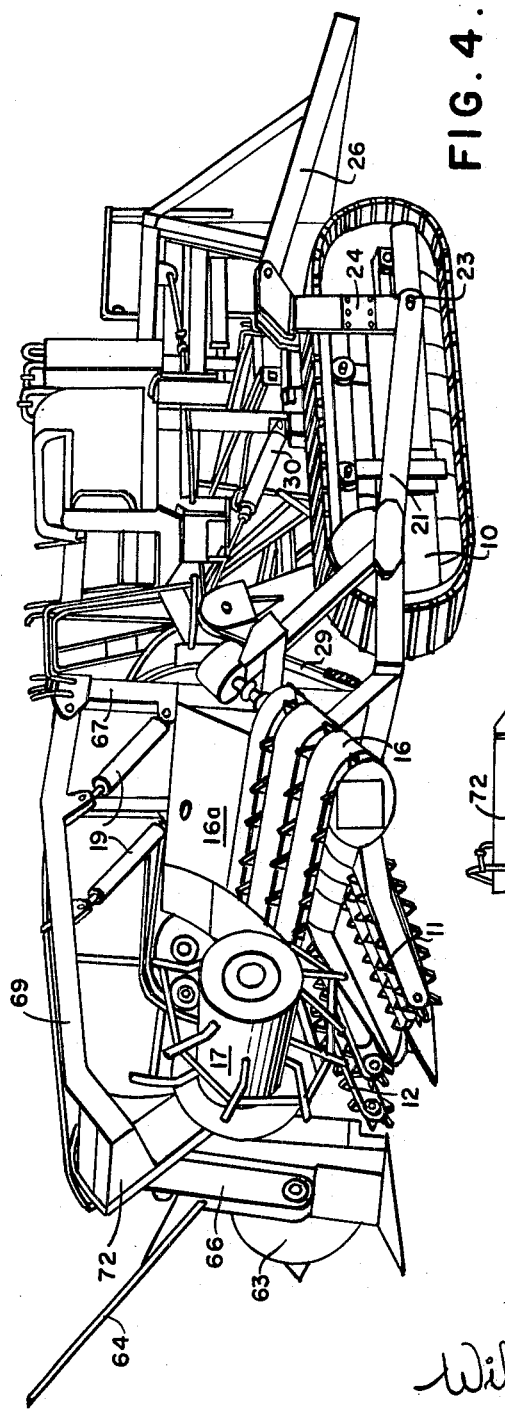
FIGURE 4 is a perspective view of the harvester of the present invention taken from the lefthand front end showing the mounting on a crawler tractor.

Referring more particularly to FIGURES 1, 2 and 3, the crawler tractor 10 has mounted thereon a longitudinal primary frame which consists of horizontally mounted longitudinal support runners 21 and 22, each of which is pivoted to the tractor at the rear end at 23. Upstanding from the rear portions of the support runners 21 and 22 are two vertical risers 24 and 25. Extending rearwardly of the vertical runners 24 and 25 are secondary counter support runners 26 and 27 jointed at their rear and supporting a counter weight 28. Secured to the forward portion of the main longitudinal support runners 21 and 22 are cables 29 which are connected to hydraulic cylinders 30 for raising and lowering the forward portion of the main longitudinal runners and the harvester unit connected on the front end about the pivot 23.

Figure 6:
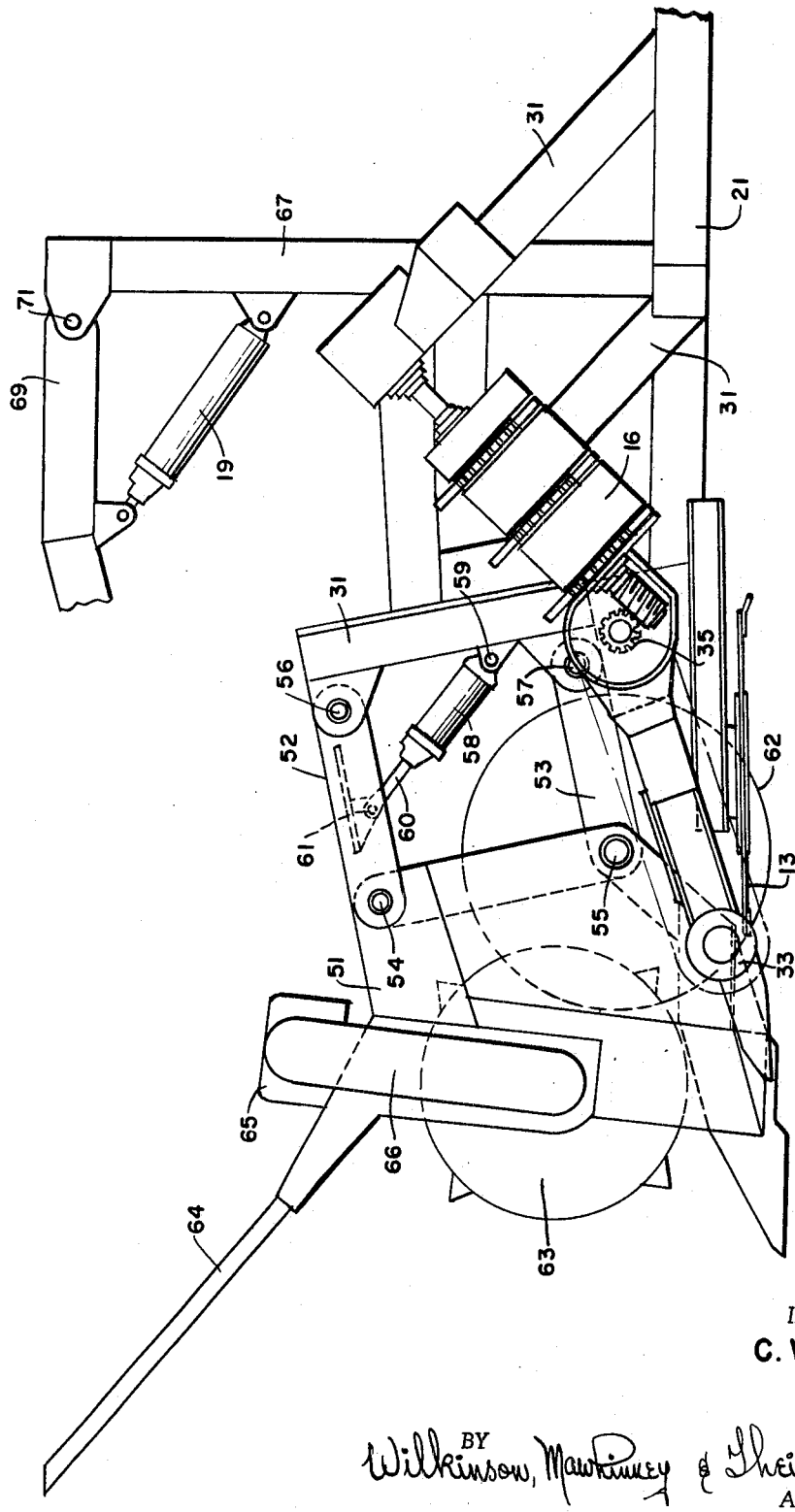
FIGURE 6 is a side elevational view with parts broken away and parts shown in dotted lines taken on a magnified scale showing the cane cutting and gauging means mounted at the front of the harvester.
Figure 7:
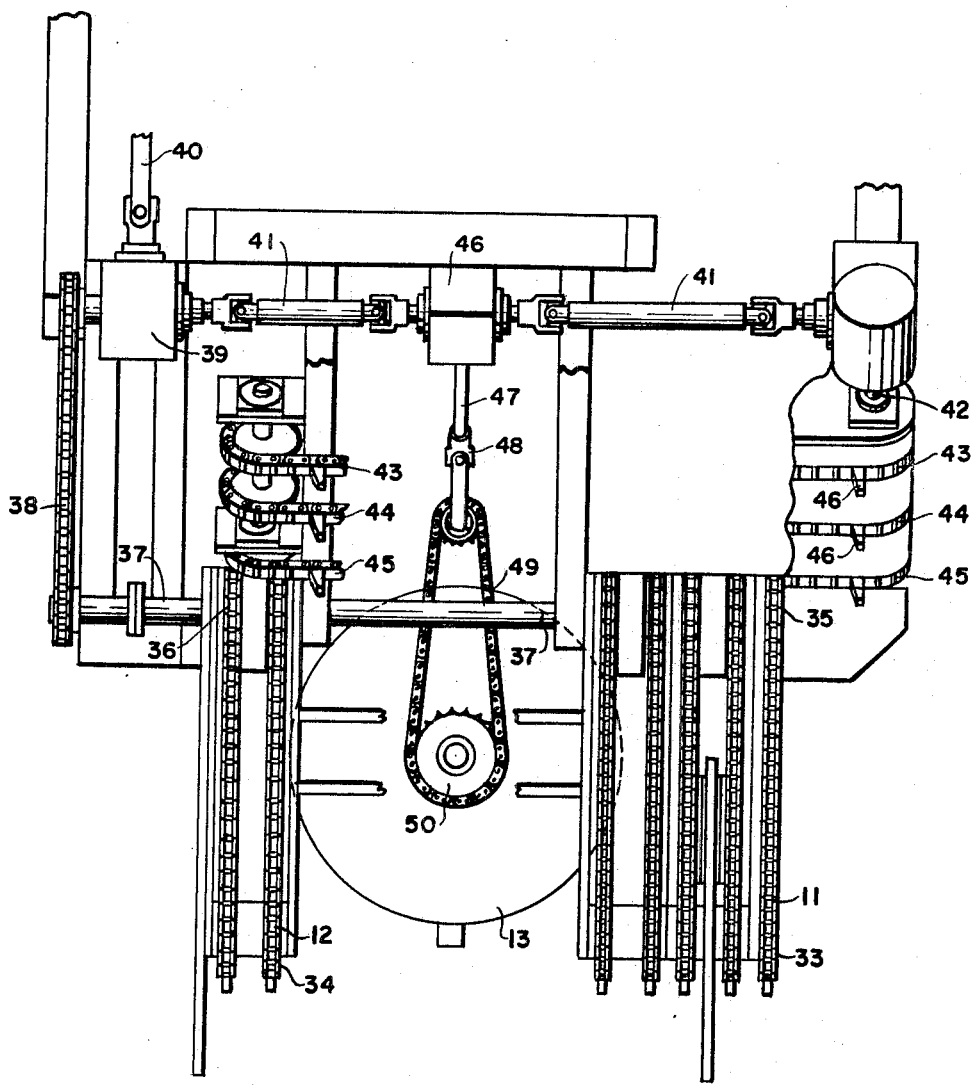
FIGURE 7 is a top plan of the earth severing cutter, gathering chain drive and transverse conveyor drive of the harvester of FIGURES 1 through 5, inclusive.

Referring now to FIGURES 1, 6 and 7, the forward portion of the longitudinal primary frame has mounted thereon the harvester unit the leading member of which are the gathering chains 11 and 12, as shown in FIGURES 1 and 7 the endless chains 11 are five in number and have upstanding projections 32. As best seen in FIGURE 7, these endless chains are roved about sprockets 33 and 34 at the front end and sprockets 35 and 36 at the rear end. The sprockets 35 and 36 are driven from a shaft 37 through a sprocket and chain drive 38 which is driven from a gear box 39 which receives its primary power from a power take-off shaft 40 connected to be driven by the conventional take-off shaft of a crawler-type tractor. Coming out of the gear box 39 and extending transverse of the harvester, as best seen in FIGURE 7, is a transverse conveyor chain drive shaft 41. The shaft 41 comprises a shaft 42, to which are connected for rotation therewith sprockets for driving endless chains 43, 44 and 45 which are shown to be rearwardly inclined in FIGURE 6. Each of the runs of endless chains 43, 44 and 45 have secured thereto, and extending therefrom, cane engaging projections 16. Rearwardly of the transverse conveyor chains 43, 44 and 45 is a buckboard 16a to keep the cut cane away from the front of the crawler tractor 10.

Intermediate the two sections of the transverse shaft 41 and connected to be driven thereby is a gear box 46 having a cane earth cutting knife drive shaft 47 having a universal joint 48 therein and being connected to drive an endless chain 49 in driving engagement with a sprocket 50 for compelling rotation and drive of the earth cutter 13.

An important feature of the present invention is the gauging device in the form of a secondary frame 51. The secondary frame 51 carries the cane earth severing cutter 13 and is attached to the primary longitudinal frame through links 52, 53 which are pivoted at 54, 55 to the secondary frame and at 56 and 57 to the primary frame, so that the secondary frame may be raised and lowered relative to the primary frame which is being effectuated through a hydraulic cylinder 58 connected at one of its ends to the primary frame at 59, and the ram 60 is connected to the link 52 at 61 so that the secondary frame 51 may be raised and lowered relative to the primary frame 21. Secured for rotation to the secondary frame is a ground engaging pneumatic tyred wheel 62 which maintains contact with the earth and which cooperates through the hydraulic cylinder 58 to cause a raising and lowering of the cane earth cutter 13 to regulate the height at which the sugar cane is cut above the earth or ground.

Mounted at the leading end of the secondary frame is a rotary cane cutting knife 63 which will engage and sever matted or tangled cane in advance of the harvester to cut a pathway to allow progress of the harvester through matted or tangled cane. A guide bar 64 also facilitates directing earth attached cane away from the harvester to make a path or to permit passage of the harvester through the cane field. A hydraulic motor 65 through a chain box drive 66 causes rotation of the cutting knife 63.

The hydraulic system which controls the raising and lowering of the primary longitudinal frame through the cylinders 30 and 58 as well as the hydraulic drive motor 65 for rotating the cane cutting knife 63 are all connected through an operator's hydraulic lever control manifold which receives its power from the hydraulic system of the crawler tractor in a manner known to this art and convenient to the tractor operator.

Also mounted at the forward end of the primary longitudinal frame 21, as best seen in FIGURES 1 and 6, are up-right supports 67, 68. Pivoted at the top of the supports 67 and 68 are longitudinal runners 69 and 70 which join the up-right supports at pivot 71. The longitudinal runners 69 and 70 are connected at their leading or forwarding end at 72 to form a book-like support for the scroll unit 17. The scroll boom 18 is raised and lowered by the hydraulic cylinders 19 to the positions shown in FIGURES 1, 2 and 3. The hydraulic cylinders 19 are likewise connected to the hydraulic system of the crawler tractor through a lever operated hydraulic valve.

Figure 5:
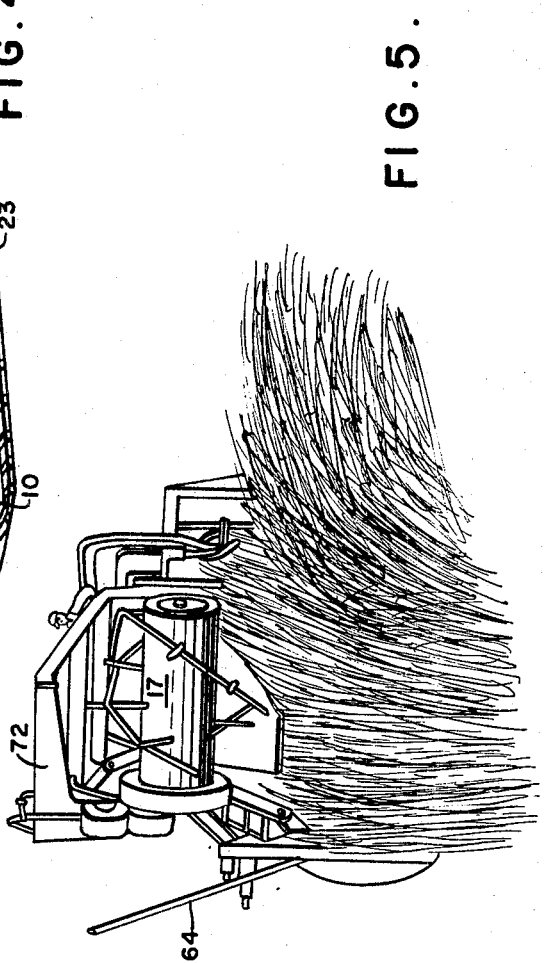
FIGURE 5 is a front perspective view of the harvester of FIGURES 1 through 4 shown cutting and transferring cut sugar cane in accordance with the present invention.

The scroll 17 has spirally arranged cane engaging projections 17a for engaging the cane as shown in FIGURE 5 for assisting and directing the cane as it is being cut from the earth laterally or transversely to the left to assist the transverse conveyor chains 43, 44 and 45 in transferring the sugar cane to the left of the harvester for discharge in advance of the crawler tractor for forming a windrow to the left side of the path of the harvester.

When the harvester is taken to the field to commence harvesting operations the secondary and primary frame are in the elevated altitudes by the cables 29 and cylinders pulling the front end of the primary longitudinal frame upwardly about the pivots 23, as shown in FIGURE 3.

When the harvester reaches the cutting area the cutting knife is lined up with the row of cane to be cut and the front end of the primary longitudinal frame is lowered so that the ground engaging pneumatic tyred wheel 62 contacts the earth and acts as a gauge for regulating the height of the cut of the cane cutting knife 18 above the ground line. All systems are engaged and as the crawler tractor 10 moves forward the cutter chains 11 and 12 cooperate with the earth cutter to move the cut cane rearwardly up the inclined apron 14 to be engaged by the projections 16 on the transverse conveyor chains 43, 44 and 45. The cut cane is then windrowed to the left of the harvester. Simultaneously, with this forward movement, should the harvester engage any tangled or uncut cane the cane cutter 63 will cut through the cane to make a path for the harvester. The scroll 17 may be employed where necessary to cooperate with the transverse conveyor to effectuate the optimum transfer of cut cane transversely of the harvester onto the windrow.

Although the invention disclosed herein is the best known method of cutting sugar cane known to me at this time, I reserve the right to all such modifications and changes as may come within the scope of the following claims.

What I claim is:

1. For use with a tractor having a power take-off and hydraulic plant; a sugar cane windrow harvester comprising:
   (a) a longitudinal primary frame adapted to be pivoted to the tractor frame for up and down rocking movement relative to the tractor, the major portion of said frame extending forwardly of said pivot
   (b) a plurality of transversely disposed upwardly inclined cane gathering endless chain means carried by said primary frame at its forward end and being movable up and down therewith,
   (c) an earth cane cutter on said gathering means and
   (d) an upwardly inclined whole cane stalk transverse conveyor means carried by said primary frame immediately rearwardly of said cane gathering means, said transverse conveyor being positioned to receive the cane from said earth cutter and gathering means to direct the cut cane transversely to one side of the harvester.

2. A sugar cane harvester as claimed in claim 1, wherein the primary frame has a portion extending rearwardly of the pivot and supports a counterweight.

3. A sugar cane harvester as claimed in claim 1, wherein the cane gathering means are transversely spaced endless chains positioned to each side of the cane cutter with their runs vertically inclined and having cane moving projections upstanding therefrom.

4. A sugar cane harvester as claimed in claim 1, further comprising cane cutting gauging means which comprises a secondary frame pivoted forwardly of the primary frame for up and down movement relative thereto, a pneumatic tyred wheel mounted for rotation on said secondary frame for maintaining ground contact, and hydraulic means connected between said primary and secondary frame for causing relative pivotal movement therebetween to control the raising and lowering of the forward portion of said primary frame upon which the cane cutter is mounted to regulate the height above the ground at which the cane is cut.

5. A sugar cane harvester as claimed in claim 1, wherein said transverse conveyor comprises a plurality of runs of endless chains displaced in parallelism with their upper axis of drive tilted rearwardly and the lowermost run being positioned to receive and transversely convey cane received from the cane cutter and cane moving projections carried by the outer run of each endless chain.

6. A sugar cane harvester as claimed in claim 1, further comprising scroll means positioned above the gathering and cutting means to assist directing cane toward the cutter and transverse conveyor.

7. A sugar cane harvester as claimed in claim 6, wherein said scroll means is mounted on a boom pivoted to an upright support mounted on the forward portion of the primary frame with means for raising and lowering the scroll to accommodate cane of varying height.

8. A sugar cane harvester as claimed in claim 4, further comprising a hydraulically driven vertically mounted cutting disc carried by said secondary frame at its forward end to cut through tangled cane to permit passage of the harvester along a cane row.

References Cited
UNITED STATES PATENTS

| | | | |
|---|---|---|---|
| 2,077,018 | 4/1937 | Schewe | 56—220 |
| 2,724,228 | 11/1955 | Duncan | 56—17 |
| 3,103,091 | 9/1963 | Duncan et al. | 56—16 |

ANTONIO F. GUIDA, Primary Examiner

U.S. Cl. X.R.

56—317